No. 873,061. PATENTED DEC. 10, 1907.
R. LOMAX & J. TOMLINSON.
ELECTRICAL CONTROL APPARATUS FOR STEAM GENERATORS.
APPLICATION FILED JULY 26, 1905.

2 SHEETS—SHEET 1.

WITNESSES
INVENTORS
RALPH LOMAX
JOHN TOMLINSON
BY THEIR ATTORNEY
Edward P. Thompson No. 873,061. PATENTED DEC. 10, 1907.
R. LOMAX & J. TOMLINSON.
ELECTRICAL CONTROL APPARATUS FOR STEAM GENERATORS.
APPLICATION FILED JULY 26, 1905.

2 SHEETS—SHEET 2.

INVENTORS
RALPH LOMAX
JOHN TOMLINSON
BY THEIR ATTORNEY
Edward P. Thompson

WITNESSES
E. J. Hicks
S. E. Hicks

UNITED STATES PATENT OFFICE.

RALPH LOMAX AND JOHN TOMLINSON, OF DARWEN, ENGLAND.

ELECTRICAL CONTROL APPARATUS FOR STEAM-GENERATORS.

No. 873,061.      Specification of Letters Patent.      Patented Dec. 10, 1907.

Application filed July 26, 1905. Serial No. 271,336.

*To all whom it may concern:*

Be it known that we, RALPH LOMAX and JOHN TOMLINSON, subjects of the King of Great Britain and Ireland, and residents of Darwen, in the county of Lancaster, England, have invented certain new and useful Improvements in Electrical Control Apparatus for Steam-Generators, of which the following is a specification.

This invention relates to electrical apparatus chiefly for automatically regulating the feed of fuel or the draft in steam generators by means of the rise and fall of steam pressure in the generator, within a predetermined range.

The invention consists principally in the arrangement of such apparatus for the purpose of varying the strength of the electric current to be used for directly or indirectly controlling the fuel feed, the damper or the air blast mechanism.

When an automatic mechanical stoker is used, this may be driven by an electric motor and in that case the speed of such motor can be regulated by bringing in and cutting out resistances; or it may be driven by a steam, internal combustion or other suitable motor and the current be employed to act in any suitable known way, for instance by means of electro-magnets, upon the throttle valve. The damper may in a similar manner be operated upon, or the draft when forced be regulated by varying the speed of a fan or blower in any of the well known ways.

In carrying out this invention, we employ a column of mercury which is acted upon directly by the pressure of steam in the generator and which acts as the primary mechanical element by which the current is controlled. This column as it rises and falls with the variations in the steam pressure closes and opens successively different circuits by direct contact of the mercury with contact surfaces, the mercury forming part of the speed controlling circuit. The current in each of the said circuits is used to excite a separate electro magnet, each of which actuates a separate switch adapted to include or exclude a resistance with reference to the main current driving the electric device which controls the steam generation.

Figure 1:
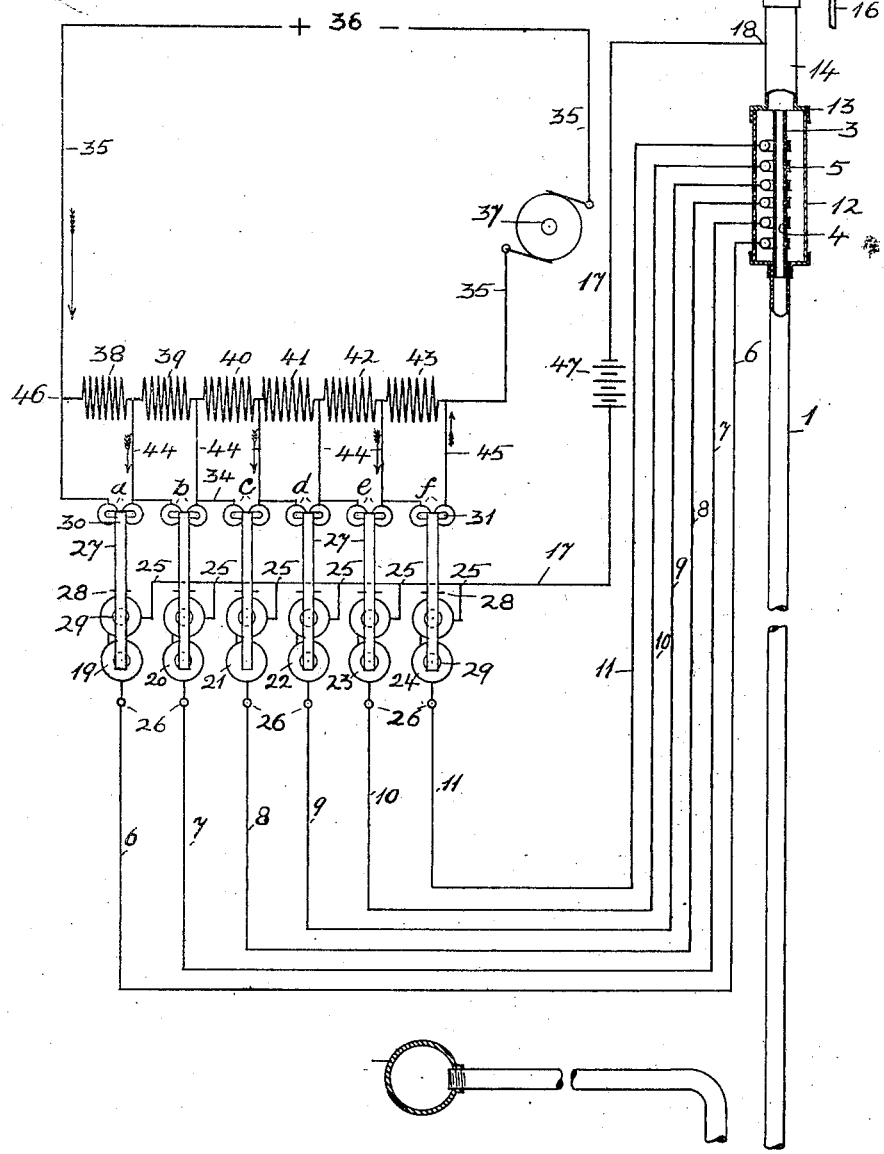
Figure 3:
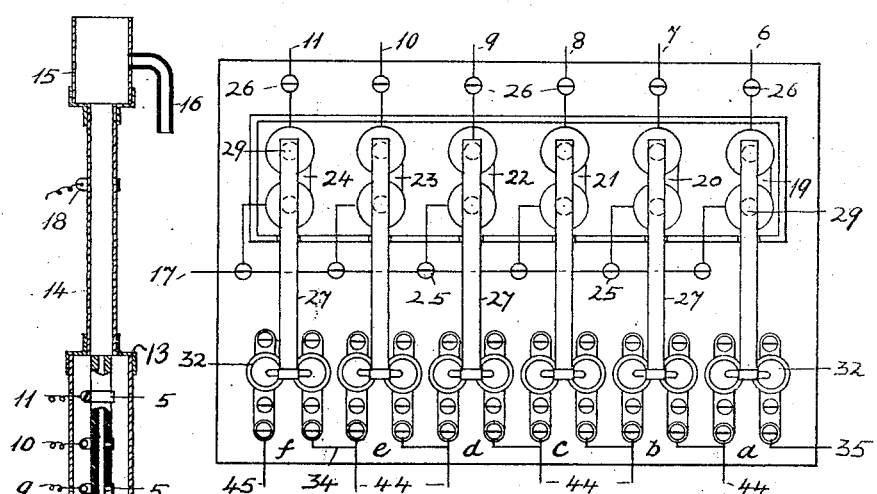
Figure 4:
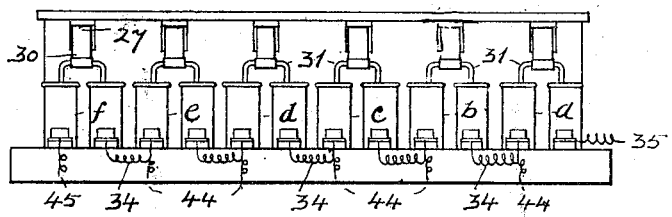
Figures 2, 5:
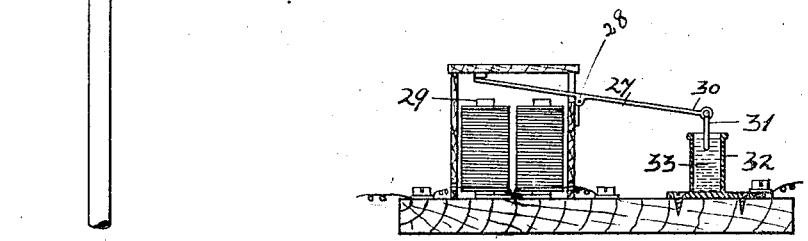

The drawing attached hereunto shows in Figure 1 a diagrammatic plan of the system or arrangement; Fig. 2 shows a sectional elevation of the mercury contact arrangement; Fig. 3 shows a plan of the apparatus for bringing in and cutting out the resistances; Fig. 4 a front elevation and Fig. 5 a part cross-sectional view of the same.

In the arrangement shown in the drawings the current for exciting the magnets is a separate one; mercury cup contact devices are used and constitute part of the main circuit to be controlled and, as one or more than one resistance is brought in, are cut out successively until all the resistances are brought in.

Referring now to the several figures of the drawings, 1 represents a siphon tube which is preferably of small bore say about one quarter inch and is inserted into the main steam pipe 2 of the generator. This tube is of a length suitable to the maximum pressure of the steam in the generator. The upper end of the tube is provided with a continuation 3 of some suitable nonconducting material, for instance vulcanized fiber, and this continuation has preferably a somewhat smaller bore than the main tube and is secured to the latter in any suitable manner; for instance it may be screwed directly into it. In the continuation tube 3 are pierced a number of small holes 4 at suitable intervals apart in the vertical direction and the holes are plugged or covered upon the outside of the tube with metal so as to form surface contacts 5. In the drawing these are shown in the form of split metal clips which are tightened upon the tube over the holes by means of screws in the well known way. To each of these clips is connected a separate insulated conductor, the number of clips and conductors shown on the drawing being 6, the conductors being numbered 6 to 11. The contacts 5 are well insulated from one another and in order to maintain the insulation and to shield the connections the latter and the continuation or fiber tube 3 are inclosed in a sleeve 12 of metal which is carried by the tube 1. Each conductor 6 to 11 is carried through a separate hole in the sleeve as shown, or the conductors may be bunched together and carried through one hole. The sleeve is then filled in with some such insulating material as paraffin wax. Above the sleeve is fixed a cap 13 carrying a tubular extension 14 preferably of larger bore than the tube 1 and at the top of the part 14 is fixed a cup 15 provided with an overflow pipe 15 for the mercury. The extension 14 and cup 15 are preferably of sufficient capacity to receive all the mercury in the tube in the event of abnormal pressure being produced in the generator. A terminal connection 18 is provided so that each of the several circuits 6 to 11 of the electro-magnets is completed through the tube 1 containing the mercury by means of the sleeve 12, cap 13, tube 14, terminal 18 and conductor 17, in the circuit of which is located the source of the current represented by 47.

The electro magnets are arranged in six pairs represented by 19, 20, 21, 22, 23, 24, and each pair is wound in the usual way, one end 25 of each winding being connected to the conductor 17 and the other end 26 of the same to the respective conductors 6 to 11. The armature 27 is pivotally fixed at 28 above the cores 29 in each pair of magnets, and extends upon both sides of the fulcrum. At the outer end 30 of each armature, a metal fork 31 is hinged so as to hang freely and forms part of the mercurial contact device for bringing in and cutting out the resistances. The other part of said device consists of a pair of cups arranged so that the prongs of the fork can dip into the pair. There is thus a pair of cups for each pair of electro-magnets. Each cup 32 is partly filled with mercury represented by the dotted lines 33 in Fig. 5 and normally, when the pair of magnets is not excited, the forked end of the armature 27 dips into the mercury, the armature being weighted at that end so that it makes contact automatically. Each said pair of cups 32 is connected to the next pair as shown by a conductor 34. The conductor 34 along with the mercury 33 and cups form part of the main circuit 35 of the electric generator indicated by the signs at 36, in which the motor to be controlled represented by 37 in Fig. 1 is located. In the circuit 35 are arranged the required number of resistances. These are represented by 38, 39, 40, 41, 42 and 43. From the ends of the resistances 38 to 42 a branch conductor 44 is led so as to complete the circuits through the several pairs of cups b, c, d, e, and f and another branch 45 from the pair f.

The terminal for the first resistance 38 is at 46 and when the mercury in the tube 1 has risen into contact with the contact clip 5 of the circuit 6, the current passes along the latter and the electro-magnets 19 are excited, the armature 27 of that pair then withdrawing the fork 31 out of the pair a of cups 32 thus cutting out the first pair a of the cups and compelling the current to pass through the resistance 38 and the remaining pairs of cups. When the mercury has risen to the contact clip 5 of the circuit 7, the second pair b of cups has been cut out and the resistance 39 brought into the circuit and as the mercury in the tube 1 rises, the remaining pairs c, d, e, and f are successively cut out and the resistances 39, 40, 41, 42 and 43 successively brought in.

Six resistances are shown on the drawing which with the open circuit will give seven speeds of the motor 37, the speed being reduced as the steam pressure and mercury column rise, and increased as they drop. A smaller or a larger number of speeds can be arranged for by increasing or reducing the number of resistances.

What we claim as our invention and desire to protect by Letters Patent of the United States is:

1. An electrical apparatus for controlling the strength of the current in a main electric circuit by means of the rise and fall of the pressure in steam generators, consisting of a series of resistances adapted to be brought into and cut out of said main circuit; a second electric circuit a column of mercury in a tube communicating with the steam generator, and included in said second electric circuit; a series of insulated contacts in said tube adapted to be successively brought into and cut out of said second circuit by the movement of the column of mercury under varying pressure and switches electrically operated by means of said contacts and adapted to bring said resistances successively into said main circuit as the steam pressure rises and to cut them out as the steam pressure falls.

2. An electrical apparatus for controlling the strength of the current in a main electric circuit by means of the rise and fall of the pressure in a steam generator, consisting of a series of resistances adapted to be brought into or cut out of said main circuit, a second electric circuit a column of mercury in a tube communicating with the steam generator and included in said second electric circuit; a series of surface contacts in said tube one above the other adapted to be brought into and cut out of said second circuit by the movement of the column of mercury under varying steam pressures, and insulated from said tube, the number of said contacts being the same as that of said resistances; an electro-magnet for each contact in conductive connection therewith and adapted to be brought into said second circuit as the mercury column makes contact with the respective surface contact; an armature for each of said magnets, and a make and break switch for each of said magnets adapted to be operated by its armature so as to bring one of said resistances into the main circuit, and cut it out therefrom as the steam pressure rises and falls.

3. An electrical apparatus for controlling the pressure in steam generators consisting of a motor, a series of resistances adapted to be brought into or cut out of the circuit of said motor; a second electric circuit a column of mercury in a tube communicating with the steam generator and included in said second electric circuit; a series of surface contacts in said tube one above the other adapted to be brought into and cut out of said second circuit by the movement of the column of mercury under the variation of the steam pressure and insulated from said tube, the number of said contacts being equal to that of said resistances; an electro magnet for each contact in conductive connection therewith and adapted to be brought into said second circuit as the mercury column makes contact with the respective surface contact; an armature for each magnet and operated thereby; a make and break mercurial switch for each magnet adapted to be operated by its armature and to bring one of said resistances into said main circuit and cut it out therefrom as the steam pressure rises and falls.

4. The combination of a pipe, a mercury column therein under steam pressure, a series of contacts insulated from each other and located in the path of the mercury, said contacts forming terminals of independent circuits, a separate electro magnet in each circuit a separate switch actuated by each one of said magnets an additional circuit, a series of resistances, for being cut into or out of said additional circuit which is independent of those already mentioned, and a device for controlling the steam generation, and regulated by the current in the last named circuit, so as to reduce or increase the steam generation when the current is reduced or increased.

In testimony whereof we have hereunto set our hands in the presence of two witnesses.

RALPH LOMAX.
JNO. TOMLINSON.

Witnesses:
 RIDLEY J. URQUHART,
 CARL BOLLÉ.